US010050517B1

(12) United States Patent
Ogino et al.

(10) Patent No.: US 10,050,517 B1
(45) Date of Patent: Aug. 14, 2018

(54) POWER SUPPLY APPARATUS CONVERTING INPUT VOLTAGE TO PREDETERMINED OUTPUT VOLTAGE AND CONTROLLING OUTPUT VOLTAGE BASED ON FEEDBACK SIGNAL CORRESPONDING TO OUTPUT VOLTAGE

(71) Applicants: Yuuta Ogino, Hyogo (JP); Shohtaroh Sohma, Osaka (JP)

(72) Inventors: Yuuta Ogino, Hyogo (JP); Shohtaroh Sohma, Osaka (JP)

(73) Assignee: RICOH ELECTRONICS DEVICES CO., LTD., Osaka (JP)

( * ) Notice: Subject to any disclaimer, the term of this patent is extended or adjusted under 35 U.S.C. 154(b) by 0 days.

(21) Appl. No.: 15/420,125

(22) Filed: Jan. 31, 2017

(51) Int. Cl.
| | |
|---|---|
| G05F 1/575 | (2006.01) |
| H02M 1/42 | (2007.01) |
| H02M 3/04 | (2006.01) |
| H02M 7/06 | (2006.01) |
| H05B 33/08 | (2006.01) |
| H02M 1/00 | (2006.01) |

(52) U.S. Cl.
CPC .............. *H02M 1/42* (2013.01); *G05F 1/575* (2013.01); *H02M 3/04* (2013.01); *H02M 7/06* (2013.01); *H05B 33/0809* (2013.01); *H02M 2001/0009* (2013.01)

(58) Field of Classification Search
CPC .......... H02M 7/04; H02M 7/06; H02M 7/062; H02M 7/064; H02M 2001/0009; H05B 33/0809
See application file for complete search history.

(56) References Cited

U.S. PATENT DOCUMENTS

| | | | |
|---|---|---|---|
| 6,700,359 B2 * | 3/2004 | Daniels | H02J 1/00 323/268 |
| 8,513,936 B2 * | 8/2013 | Hane | H02M 3/1563 323/288 |
| 2007/0216388 A1 | 9/2007 | Sohma | |
| 2007/0247131 A1 | 10/2007 | Sohma | |
| 2008/0080219 A1 | 4/2008 | Sohma | |
| 2008/0150508 A1 | 6/2008 | Sohma | |
| 2009/0135632 A1 | 5/2009 | Sohma | |

(Continued)

FOREIGN PATENT DOCUMENTS

| | | |
|---|---|---|
| JP | 5110197 | 10/2012 |
| JP | 2013-38882 | 2/2013 |

(Continued)

*Primary Examiner* — Matthew Nguyen
(74) *Attorney, Agent, or Firm* — Cooper & Dunham LLP

(57) ABSTRACT

A power supply apparatus of the present invention has an input terminal and an output terminal, and converts an input voltage at the input terminal into a predetermined output voltage at the output terminal. The power supply apparatus includes first and second power supply circuits and a smoothing capacitor. The first power supply circuit is coupled between the input terminal and the output terminal, and converts the input voltage into a predetermined voltage to output the predetermined voltage. The smoothing capacitor is coupled to the output terminal. The second power supply circuit outputs a predetermined voltage or current to the output terminal via the smoothing capacitor, based on a feedback signal corresponding to the predetermined output voltage.

23 Claims, 17 Drawing Sheets

(56) References Cited

U.S. PATENT DOCUMENTS

| | | | |
|---|---|---|---|
| 2009/0207974 A1* | 8/2009 | Yi | A61B 6/4405 378/115 |
| 2010/0013447 A1 | 1/2010 | Furuse et al. | |
| 2010/0181977 A1 | 7/2010 | Sohma | |
| 2011/0043175 A1 | 2/2011 | Sohma | |
| 2011/0043176 A1 | 2/2011 | Sohma | |
| 2013/0099846 A1 | 4/2013 | Sohma | |
| 2016/0087602 A1* | 3/2016 | Adams | G05F 3/04 327/532 |

FOREIGN PATENT DOCUMENTS

| | | |
|---|---|---|
| JP | 2013-90520 | 5/2013 |
| JP | 2016-59221 | 4/2016 |

* cited by examiner

POWER FACTOR CORRECTION CIRCUIT 12A

US 10,050,517 B1

POWER SUPPLY APPARATUS CONVERTING INPUT VOLTAGE TO PREDETERMINED OUTPUT VOLTAGE AND CONTROLLING OUTPUT VOLTAGE BASED ON FEEDBACK SIGNAL CORRESPONDING TO OUTPUT VOLTAGE

BACKGROUND OF THE INVENTION

Field of the Invention

The present invention relates to a power supply apparatus such as an ACDC converter or a DCDC converter, for example, electronic equipment including the power supply apparatus, and a power supply circuit for the power supply apparatus.

Description of Related Art

A time constant and responsiveness of a passive component included in a typical switching power supply decrease in accordance with a level of a withstand voltage. Accordingly, responsiveness to sharp load transient particularly in a high power application-specific power supply apparatus tends to be lower than that in a small power application-specific power supply apparatus. In addition, a power factor correction circuit is essential for regulating an input harmonic, particularly for high power applications, and power factor correction circuits using various control systems have been developed. It is known that such a power factor correction circuit changes an input current in accordance with a pulsating voltage rectified by a diode bridge, so that pulsation occurs at an output current or an output voltage.

For example, FIG. 6 of Patent Document 1 (Japanese Patent No. JP5110197B) shows such an example that an output including pulsation, which is provided from a power factor correction circuit, is stepped down and is smoothed by a smoothing switching converter. Such a technique shown in FIG. 6 is typically called a two-converter system. While a switching converter is efficient on one hand, there are problems of an increased circuit scale and an increased noise due to a large number of components in a switching circuit. Regarding those problems, according to Patent Document 1, a constant-current feedback control circuit that variably controls impedance is connected in series to a light emitting diode (LED) serving as a load, in an effort to miniaturize a power supply apparatus.

In addition, according to Patent Document 2 (Japanese Patent Laid-open Publication No. JP2013-038882A), when an input voltage including pulsation is higher than a predetermined voltage in a power supply apparatus that adopts a two-converter system, a power factor correction circuit is caused to stop and only a smoothing switching converter is allowed to operate. This allows a reduction in loss of a power factor correction circuit, a reduction in size, and an increase in efficiency.

SUMMARY OF THE INVENTION

A problem associated with a high power application-specific power supply apparatus is an unsatisfactory capability of following an excess or a deficiency of a temporary output voltage or current relative to a predetermined output direct-current voltage or current of a load.

According to one aspect of the present invention, there is provided a power supply apparatus having an input terminal and an output terminal, where the power supply apparatus converts an input voltage at the input terminal into a predetermined output voltage at the output terminal. The power supply apparatus includes first and second power supply circuits and a smoothing capacitor. The first power supply circuit is coupled between the input terminal and the output terminal, and converts the input voltage into a predetermined voltage to output the predetermined voltage. The smoothing capacitor is coupled to the output terminal. The second power supply circuit outputs a predetermined voltage or current to the output terminal via the smoothing capacitor, based on a feedback signal corresponding to the predetermined output voltage.

With the power supply apparatus according to the present invention, the second power supply circuit having a response higher than that of the first power supply circuit compensates for an excess or a deficiency relative to a desired direct-current current or voltage of a load via the capacitor, so that the load-transient response characteristics of the first power supply circuit can be improved so as to have a higher speed as compared to the prior art.

MODE FOR CARRYING OUT THE INVENTION

Preferred embodiments according to the present invention will be described below with reference to the drawings. Note that like components are denoted by the same characters in each of the following preferred embodiments.

FIRST PREFERRED EMBODIMENT

Figure 1:
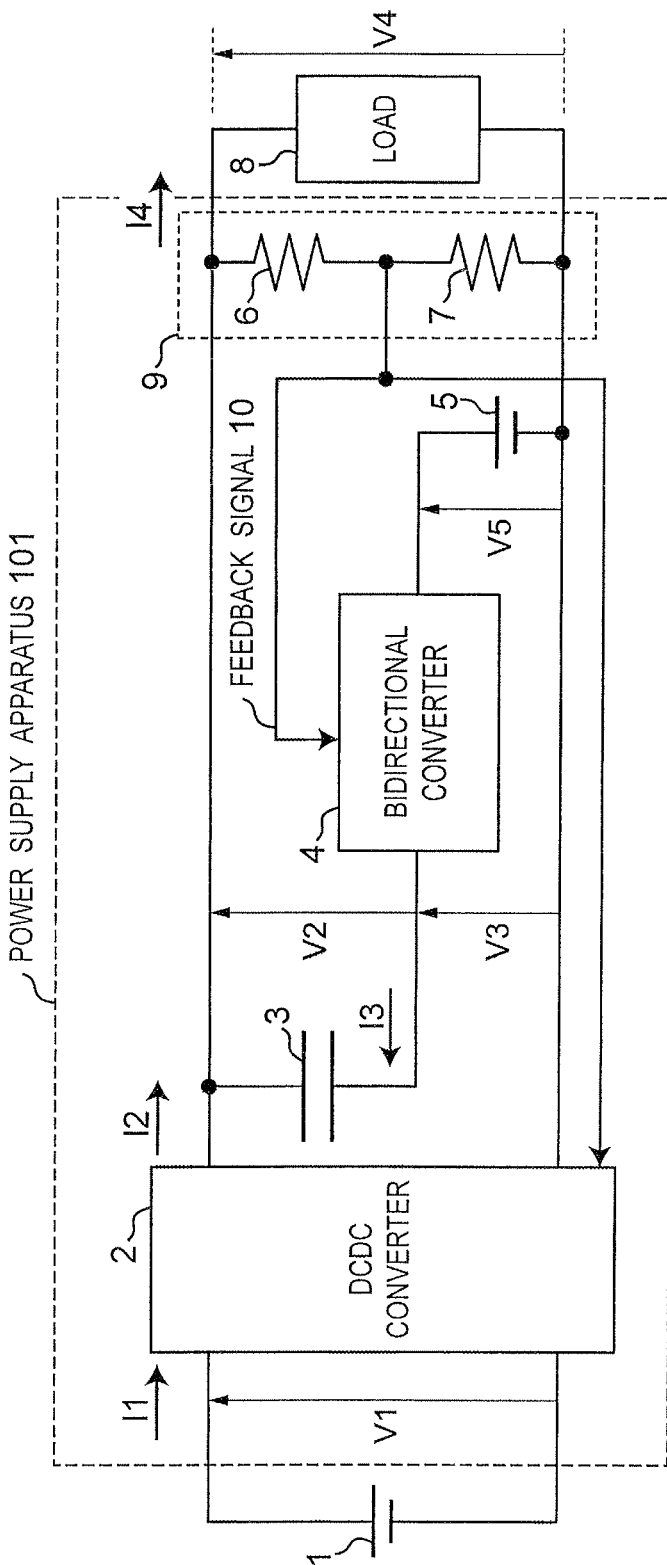
FIG. 1 is a circuit diagram showing a configuration of a power supply apparatus 101 according to a first preferred embodiment of the present invention.

FIG. 1 is a circuit diagram showing a configuration of a power supply apparatus 101 according to a first preferred embodiment of the present invention. In FIG. 1, the power supply apparatus 101 is a DCDC converter, and includes a direct-current voltage source 1, a DCDC converter 2, and a smoothing capacitor 3. The power supply apparatus 101 further includes a bidirectional DCDC converter (which will be referred to as a bidirectional converter hereinafter) 4, a direct-current voltage source 5, voltage dividing resistors 6 and 7, and a load 8.

In FIG. 1, a direct-current voltage from the direct-current voltage source 1 is input to the DCDC converter 2. A voltage input to the DCDC converter 2 is represented by V1 and its corresponding current is represented by I1. The DCDC converter 2 converts electric power inputted from the direct-current voltage source 1 to provide an output. An output terminal of the DCDC converter 2 is coupled to the bidirectional converter 4 via the smoothing capacitor 3 and is also coupled to one end of the load 8. The smoothing capacitor 3 constitutes a smoothing circuit that smooths a voltage or current to be inputted thereto. In this case, a current outputted from the DCDC converter 2 is represented by I2. A voltage V4 applied to the load 8 is divided by a voltage dividing circuit 9 including the two voltage dividing resistors 6 and 7 connected in series, so that a feedback signal 10 generates and is input to the DCDC converter 2 and the bidirectional converter 4.

Figure 2A:
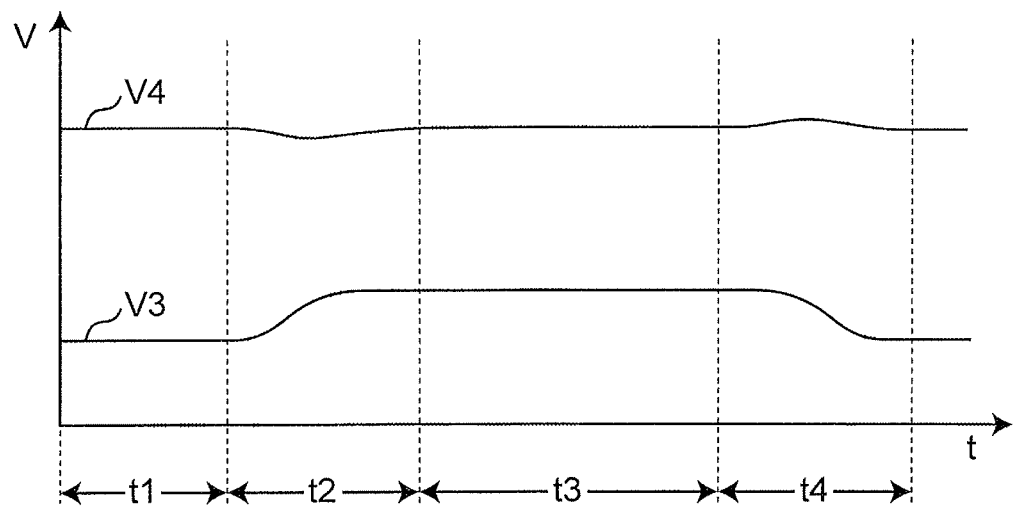
FIG. 2A is a timing chart of voltages, which shows operations of the power supply apparatus 101 in FIG. 1.
Figure 2B:
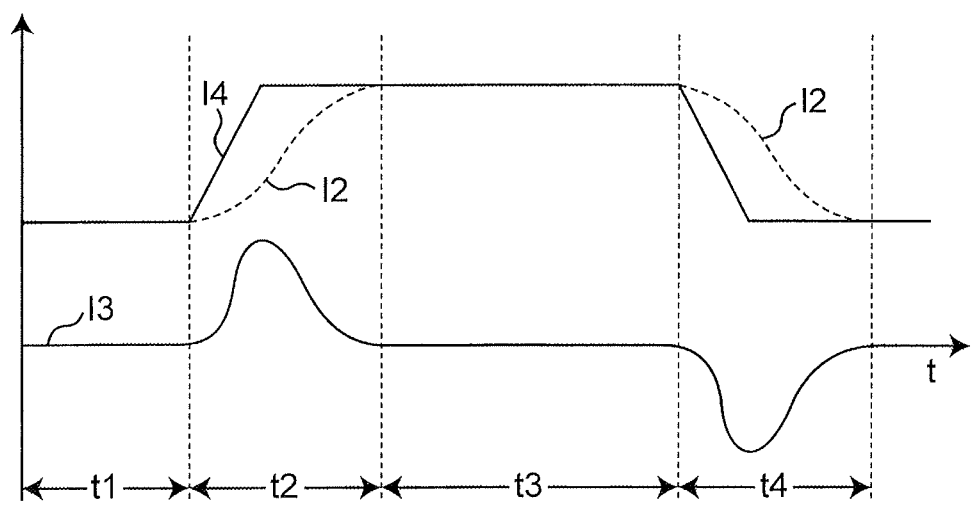
FIG. 2B is a timing chart of currents, which shows operations of the power supply apparatus 101 in FIG. 1.

The bidirectional converter 4 steps up or down a direct-current voltage V5 from the direct-current voltage source 5, to a predetermined direct-current voltage V3, based on the feedback signal 10 corresponding to the output voltage V4, and thereafter outputs the direct-current voltage V3 to the load 8 via the smoothing capacitor 3. Otherwise, the bidirectional converter 4 steps up or down the voltage V3 input via the smoothing capacitor 3, to a predetermined voltage V5, based on the feedback signal 10, and thereafter outputs the voltage V5 to the direct-current voltage source 5. That is, the bidirectional converter 4 bidirectionally converts a direct-current voltage so as to step up or down the direct-current voltage, based on the feedback signal 10. In this case, a voltage across the smoothing capacitor 3 is represented by V3 and a current flowing through the smoothing capacitor 3 is represented by I3. In addition, a current flowing through the load 8 is represented by I4. In other words, a direct-current current I3 can be supplied from the bidirectional converter 4 to the smoothing capacitor 3 in a direction of an arrow in FIG. 1 or can be extracted from the smoothing capacitor 3 in a direction opposite to the direction of the arrow in FIG. 1. The above-described operations do not depend on levels of withstand voltages of the DCDC converter 2 and bidirectional converter 4. That is, as shown in FIGS. 2A and 2B to be described later, even in a case where a withstand voltage of the DCDC converter 2 is set to be higher than a withstand voltage of the bidirectional converter 4, the bidirectional converter 4 can operate in a similar manner. Further, the lower a withstand voltage of the bidirectional converter 4 becomes, the higher responsiveness the bidirectional converter 4 can have as compared to the prior art.

In the power supply apparatus configured as described above, the DCDC converter 2 can be constituted of a step-up converter in a case where the voltage V4 is higher than the voltage V1. In addition, the DCDC converter 2 is required to be constituted of a step-down converter in a case where the voltage V4 is lower than the voltage V1.

FIG. 2A is a timing chart of voltages, which shows operations of the power supply apparatus 101 in FIG. 1. FIG. 2B is a timing chart of currents, which shows operations of the power supply apparatus 101 in FIG. 1.

During a time interval t1 in each of FIGS. 2A and 2B, the load current I4 is constant. In addition, the DCDC converter 2 outputs the current I2 that corresponds to the load current I4 and the voltage V4 that corresponds to the feedback signal 10 generated by the voltage V4 and the voltage dividing circuit 9 and, using electric power inputted from the direct-current voltage source 1. The bidirectional converter 4 outputs the current I3 that corresponds to a change in the feedback signal 10. During the time interval t1, the feedback signal 10 is constant since the voltage V4 is constant, the current I3 outputted from the bidirectional converter 4 is 0, and the voltage V3 is constant.

During a time interval t2, when the load current I4 increases and the voltage V4 decreases so that the feedback signal 10 decreases, the current I2 outputted from the DCDC converter 2 gradually increases up to a current corresponding to the load current I4, in accordance with a time constant of the DCDC converter 2. Also regarding the bidirectional converter 4, in response to a decrease in the feedback signal 10, the current I3 outputted from the bidirectional converter 4 is caused to increase in accordance with a time constant of the bidirectional converter 4. At that time, the responsiveness of the bidirectional converter 4 is higher than the responsiveness of the DCDC converter 2 since a time constant of a typical switching power supply decreases depending on a level of a withstand voltage. Accordingly, in the time interval t2 where there is a deficiency of the current I2 outputted from the DCDC converter 2 relative to the load current I4 which has increased, the current I3 outputted from the bidirectional converter 4 compensates for a deficiency of the load current I4. Thus, the power supply apparatus 101 can be improved so as to have higher responsiveness to the load current I4, as a consequence.

During a time interval t3, operations similar to those in the time interval t1 are performed. During a time interval t4, the load current I4 decreases, the voltage V4 increases, and the feedback signal 10 increases. At that time, operations reverse to those in the time interval t2 are performed in such a manner that the bidirectional converter 4 extracts, as the current I3, an excess of the current I2, which is outputted from the DCDC converter 2 and becomes temporarily too large with respect to a decrement of the load current I4, via the smoothing capacitor 3 in a direction opposite to the direction of the arrow in FIG. 1. This can improve the responsiveness of the power supply apparatus 101 to the load current I4. In addition, at that time, excess electric power extracted as the current I3 by the bidirectional converter 4 can be regenerated in the direct-current voltage source 5, so that a reduction in efficiency of the power supply apparatus 101 can be minimized as a consequence.

In this case, a withstand voltage of the bidirectional converter 4 is determined by the voltage V3 or the voltage V5, whichever is higher. If the bidirectional converter 4 is a step-down converter, the voltage V5 should be set at a value higher than a maximum value of the voltage V3.

(1) If the bidirectional converter 4 is a step-up converter, the voltage V5 should be set at a value lower than a minimum value of the voltage V3.

(2) If the bidirectional converter 4 is a step-up and step-down converter, the voltage V5 can have an arbitrary value.

SECOND PREFERRED EMBODIMENT

Figure 3:
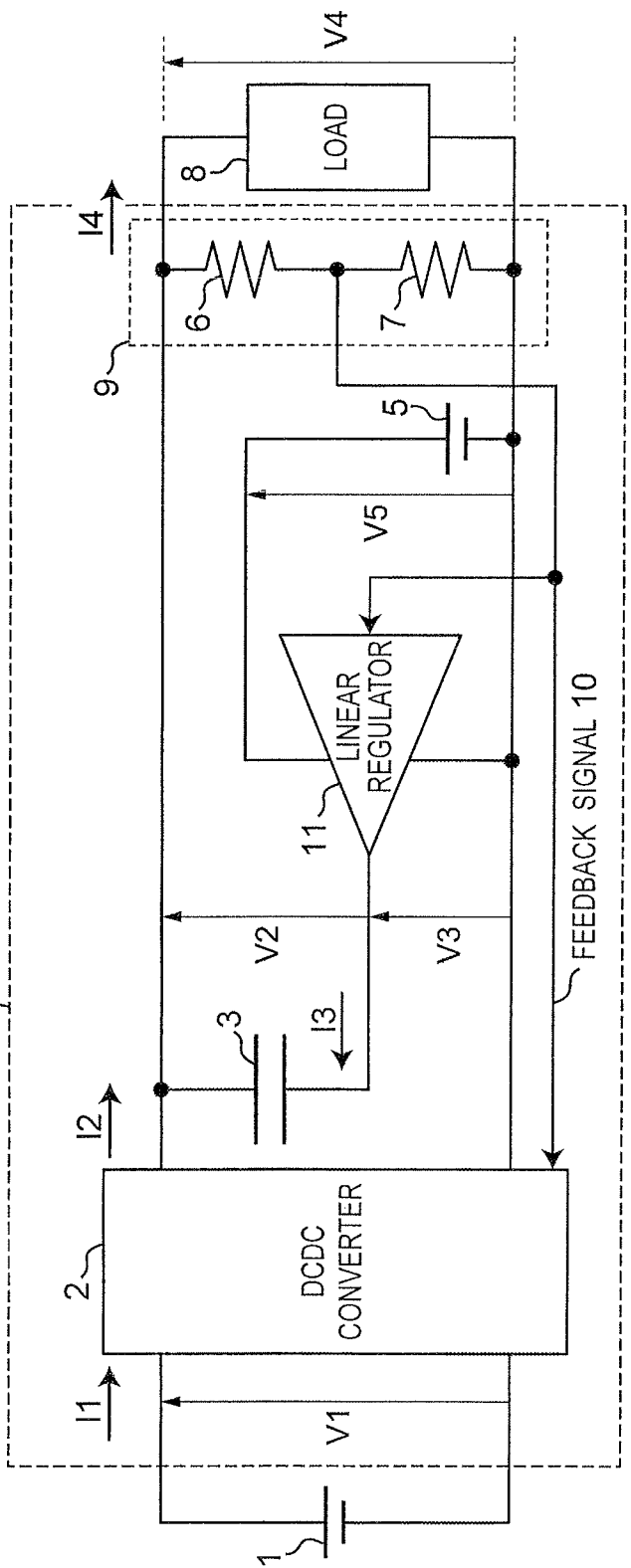
FIG. 3 is a circuit diagram showing a configuration of a power supply apparatus 102 according to a second preferred embodiment of the present invention.

FIG. 3 is a circuit diagram showing a configuration of a power supply apparatus 102 according to a second preferred embodiment of the present invention. The power supply apparatus 102 is different from the power supply apparatus 101 according to the first preferred embodiment in that the bidirectional converter 4 is replaced with a linear regulator 11.

The linear regulator 11, like the bidirectional converter 4, outputs a current I3 corresponding to a change in a feedback signal 10, in accordance with a time constant of the linear regulator 11. At that time, it is typically known that the time constant of the linear regulator 11 is smaller than a time constant of a DCDC converter 2 having a higher withstand voltage, so that functions and effects similar to those in the first preferred embodiment are provided as a consequence.

The use of a liner regulator, which can be typically constituted of a circuit simpler than that of a bidirectional converter, allows a reduction in size as compared to the power supply apparatus 101 according to the first preferred embodiment. On the other hand, a difference from the first preferred embodiment lies in that, at a time of load transient such as the time interval t4 in FIGS. 2A and 2B, excess electric power is not regenerated in a direct-current voltage source 5 so that the bidirectional converter 4 operates, but is calculated as loss.

THIRD PREFERRED EMBODIMENT

Figure 4:
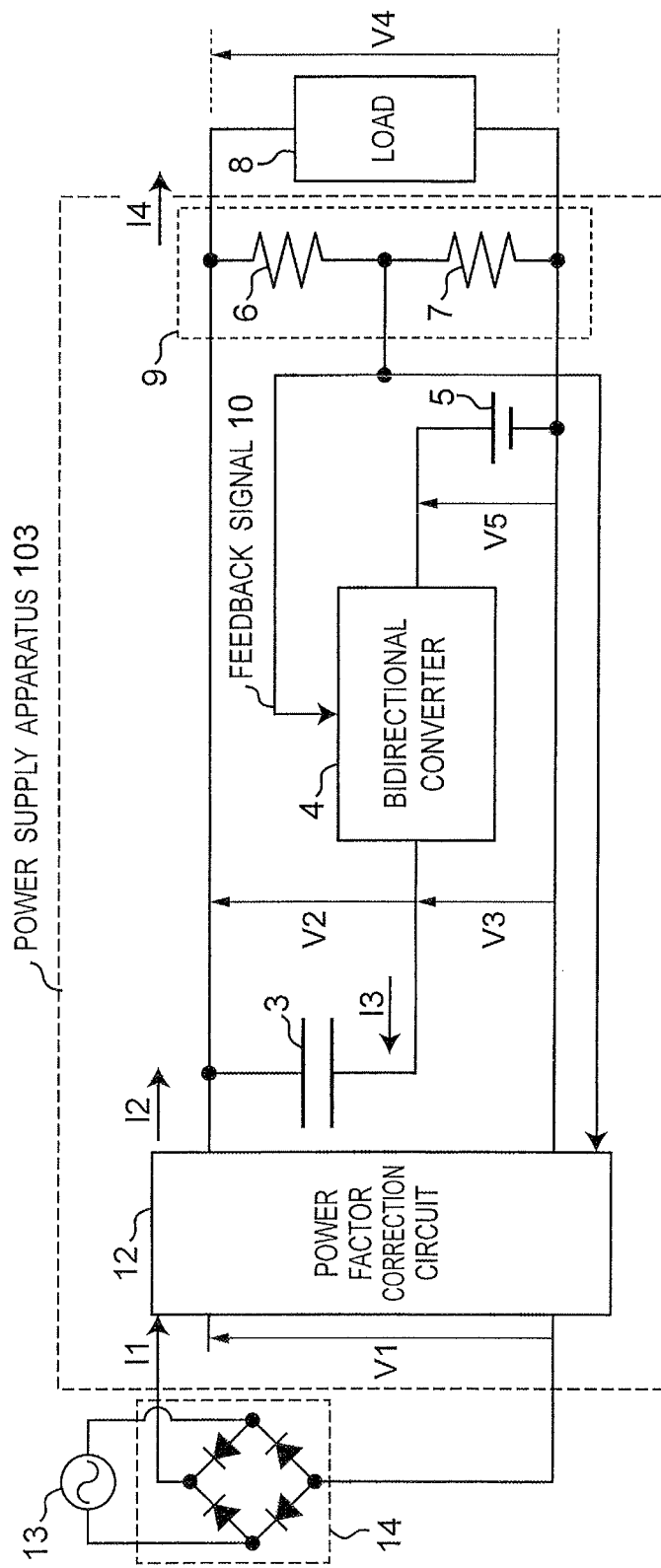
FIG. 4 is a circuit diagram showing a configuration of a power supply apparatus 103 according to a third preferred embodiment of the present invention.

FIG. 4 is a circuit diagram showing a configuration of a power supply apparatus 103 according to a third preferred embodiment of the present invention. The power supply apparatus 103 is different from the power supply apparatus 101 according to the first preferred embodiment in the following respects.

(1) The DCDC converter 2 is replaced with a power factor correction circuit 12 that corrects a power factor of the power supply apparatus 103.

(2) The direct-current voltage source 1 is replaced with an alternating-current power supply 13, and the alternating-current power supply 13 serves as a power supply that inputs power to the power factor correction circuit 12 via a rectifying circuit 14 including a diode bridge circuit.

It is typically known that a power factor correction circuit changes an input current in accordance with a pulsating voltage rectified by a diode bridge circuit or the like, so that a ripple occurs at an output current or voltage. The power supply apparatus 103 according to the third preferred embodiment of the present invention has a function of smoothing such a ripple.

In the power supply apparatus 103, by constituting the power factor correction circuit 12 of a step-up and step-down converter, it is possible to achieve a function of smoothing the ripple at a voltage V4 of an arbitrary value even in a case where the voltage V4 does not depend on a level of a voltage V1 and is lower than a maximum value of the voltage V1. In a case where the voltage V4 is higher than a maximum value of the voltage V1, the power factor correction circuit 12 can be constituted of a step-up converter. Examples of a step-up and step-down converter may include a flyback converter, a polarity reversal converter, an H-bridge step-up and step-down converter, and the like.

Figure 5A:
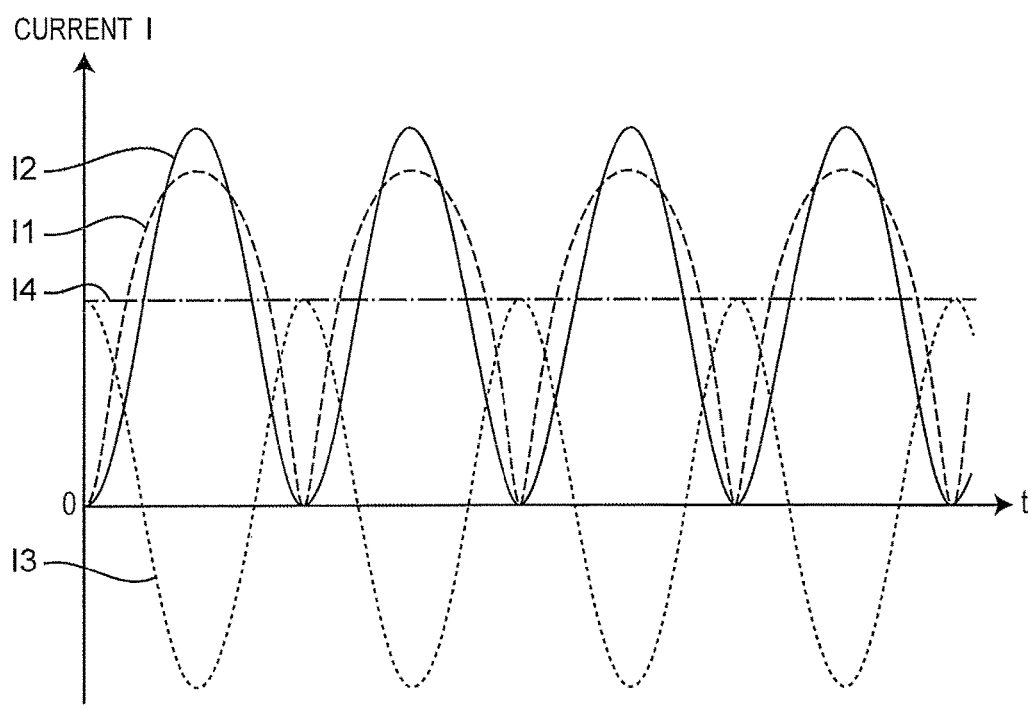
FIG. 5A is a timing chart of currents, which shows operations of the power supply apparatus 103 in FIG. 4.
Figure 5B:
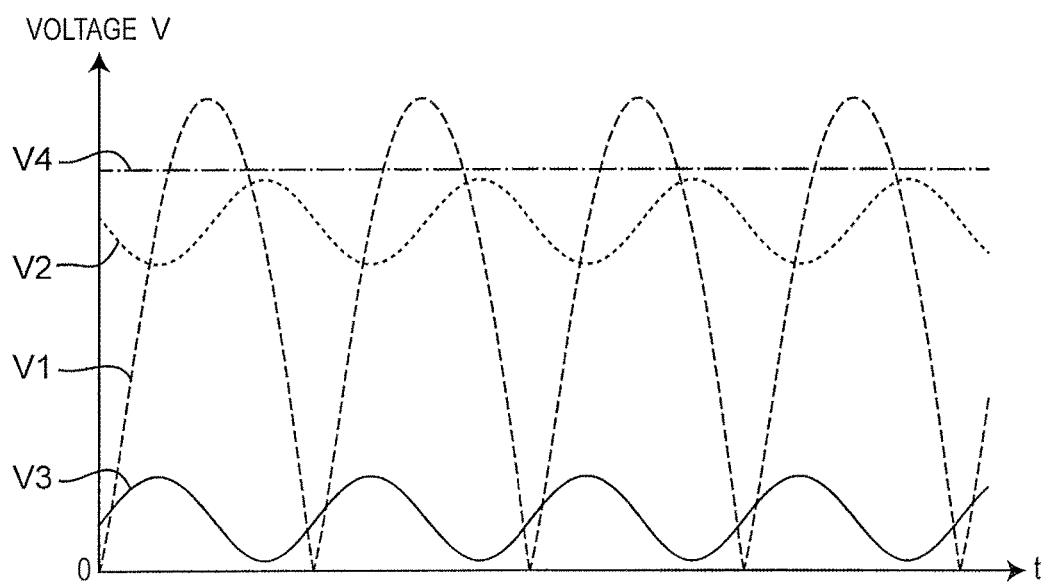
FIG. 5B is a timing chart of voltages, which shows operations of the power supply apparatus 103 in FIG. 4.

FIG. 5A is a timing chart of currents, which shows operations of the power supply apparatus 103 in FIG. 4. FIG. 5B is a timing chart of voltages, which shows operations of the power supply apparatus 103 in FIG. 4.

As is made clear from FIGS. 5A and 5B, the power factor correction circuit 12 allows the voltage V1 and a current I1 to have waveforms similar to each other. Assuming that the power factor correction circuit 12 is a switching converter, for example, and loss can be disregarded, input electric power (V1×I1) and output electric power (V4×I2) are approximately equal to each other. Accordingly, a current I2 is expressed by the following equation.

$$I2=V1 \times I1/V4$$

Thus, also the current I2 is a pulsating current like the current I1. Since the bidirectional converter 4 operates so as to make a signal level of a feedback signal constant, the voltage V4 is constant. The bidirectional converter 4 controls a voltage V3 in order to make the voltage V4 constant, so that a voltage (V2+V3) is constant. In addition, this matter is equivalent to operations of cancelling the pulsating current I2 and converting the pulsating current I2 into a current I4 via the smoothing capacitor 3 in the bidirectional converter 4, so that the current I3 and a ripple current of the current I2 are symmetrical and an average value of the current I3 is 0. From operation waveforms shown in FIGS. 5A and 5B, it is made clear that the bidirectional converter 4 can smooth a ripple current and a ripple voltage of the power factor correction circuit 12 with the configuration in FIG. 4.

In this case, a withstand voltage of the bidirectional converter 4 is determined by the voltage V3 or a voltage V5, whichever is higher. If the bidirectional converter 4 is a step-down converter, the voltage V5 should be set at a value higher than a maximum value of the voltage V3.

(1) If the bidirectional converter 4 is a step-up converter, the voltage V5 should be set at a value lower than a minimum value of the voltage V3.

(2) If the bidirectional converter 4 is a step-up and step-down converter, the voltage V5 can have an arbitrary value. Since the direct-current voltage source 5 supplies to the bidirectional converter 4 a current having an average value of approximately 0, the direct-current voltage source 5 need not achieve high performance as a power supply.

Accordingly, while the direct-current voltage source 5 can be constituted of a power supply using an auxiliary winding extending from the power factor correction circuit 12, for example, an amplitude range of V3 should be determined taking into account variation in withstand voltage of the direct-current voltage source 5 if the bidirectional converter 4 is a step-down converter or a step-up converter. In addition, a withstand voltage of the bidirectional converter 4 should include an adequate margin for variation. On the other hand, if the bidirectional converter 4 is a step-up and step-down converter, the direct-current voltage source 5 can have an arbitrary value. Accordingly, if an average value of V3 is set at, for example, a median value in variation of the direct-current voltage source 5, a withstand voltage of the bidirectional converter 4 is determined substantially by a ripple voltage of the voltage V3 unless variation in voltage of the direct-current voltage source 5 exceeds V3.

FOURTH PREFERRED EMBODIMENT

Figure 6:
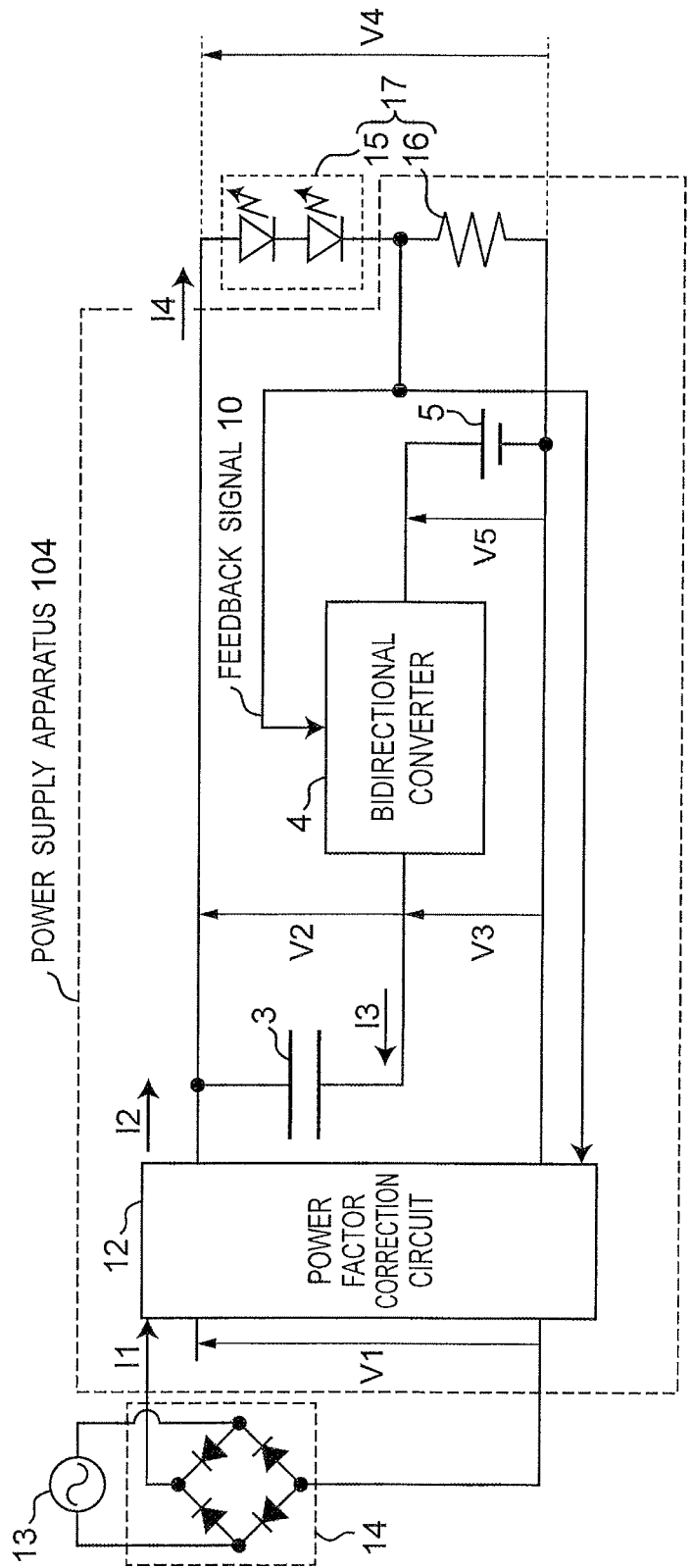
FIG. 6 is a circuit diagram showing a configuration of a power supply apparatus 104 according to a fourth preferred embodiment of the present invention.

FIG. 6 is a circuit diagram showing a configuration of a power supply apparatus 104 according to a fourth preferred embodiment of the present invention. The power supply apparatus 104 is different from the power supply apparatus 103 according to the third preferred embodiment in that a load 8 is replaced with a series circuit in which an LED light emitting element 15 formed of series connection of, for example, two LEDs D1 and D2, and a current sensing resistor 16 are connected in series, and that the series circuit serves as a voltage dividing circuit 17.

In this case, the voltage dividing circuit 17 including the LED light emitting element 15 and the current sensing resistor 16 divides an output voltage V4, and generates a feedback signal corresponding to the output voltage V4. A signal voltage of the feedback signal is determined by a product of a current I4 flowing through the current sensing resistor 16 and a resistance of the current sensing resistor 16. Since a bidirectional converter 4 operates so as to make the feedback signal constant, the current I4 is constant on the assumption that the resistance of the current sensing resistor 16 is constant. Accordingly, operation waveforms similar to those in FIGS. 5A and 5B are provided.

The power supply apparatus configured as described above has functions and effects similar to those in the first preferred embodiment.

FIFTH PREFERRED EMBODIMENT

Figure 7:
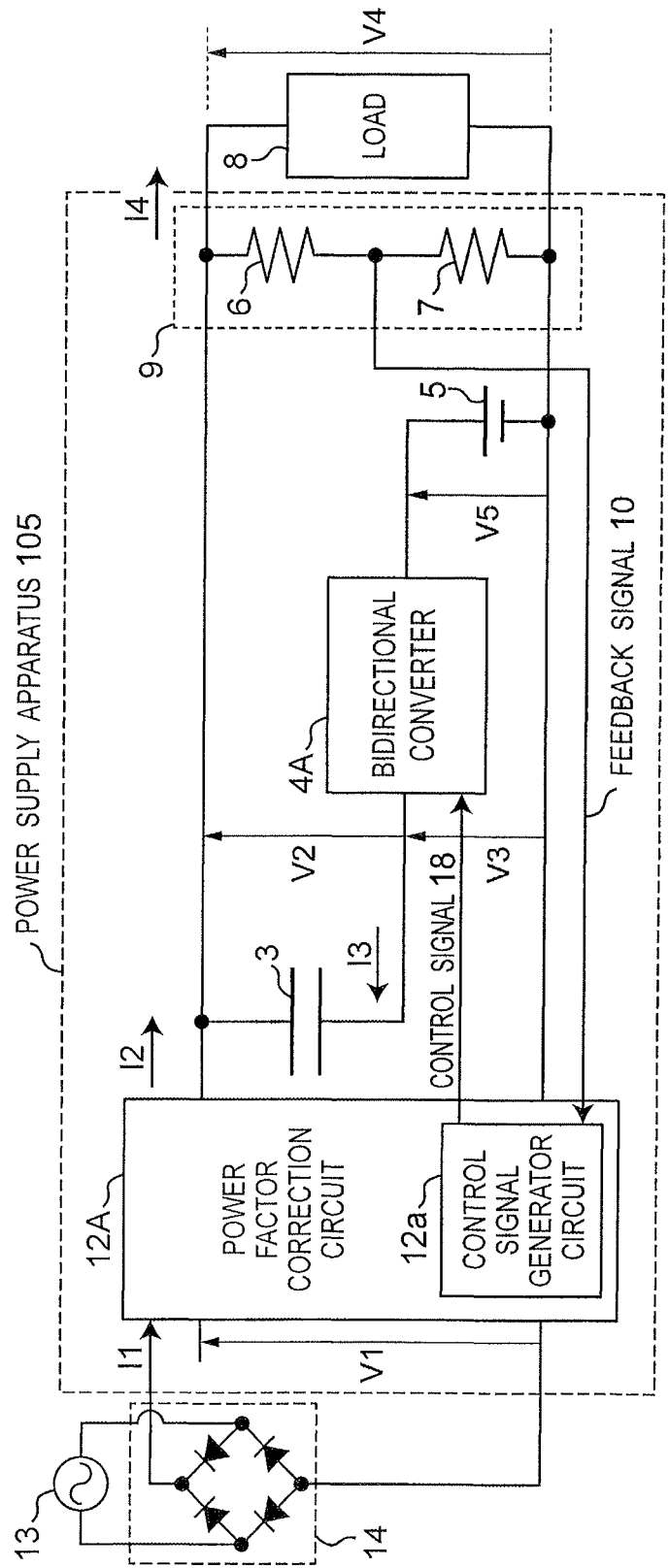
FIG. 7 is a circuit diagram showing a configuration of a power supply apparatus 105 according to a fifth preferred embodiment of the present invention.

FIG. 7 is a circuit diagram showing a configuration of a power supply apparatus 105 according to a fifth preferred embodiment of the present invention. The power supply apparatus 105 is different from the power supply apparatus 103 according to the third preferred embodiment in the following respects.

(1) The feedback signal 10 input to the bidirectional converter 4 is replaced with a control signal 18 outputted from a power factor correction circuit 12, and the bidirectional converter 4 is replaced with a bidirectional converter 4A.

(2) The power factor correction circuit 12 is replaced with a power factor correction circuit 12A, and the power factor correction circuit 12A further includes a control signal generator circuit 12a that generates a control signal 18, based on a feedback signal 10.

The control signal 18 outputted from the power factor correction circuit 12A uses an output signal of a differential amplifier 45 (FIG. 9) included in the power factor correction circuit 12A, for example. As a result of this, a function equivalent to using the above-described feedback signal 10 as a signal input to the bidirectional converter 4A can be obtained.

Figure 8:
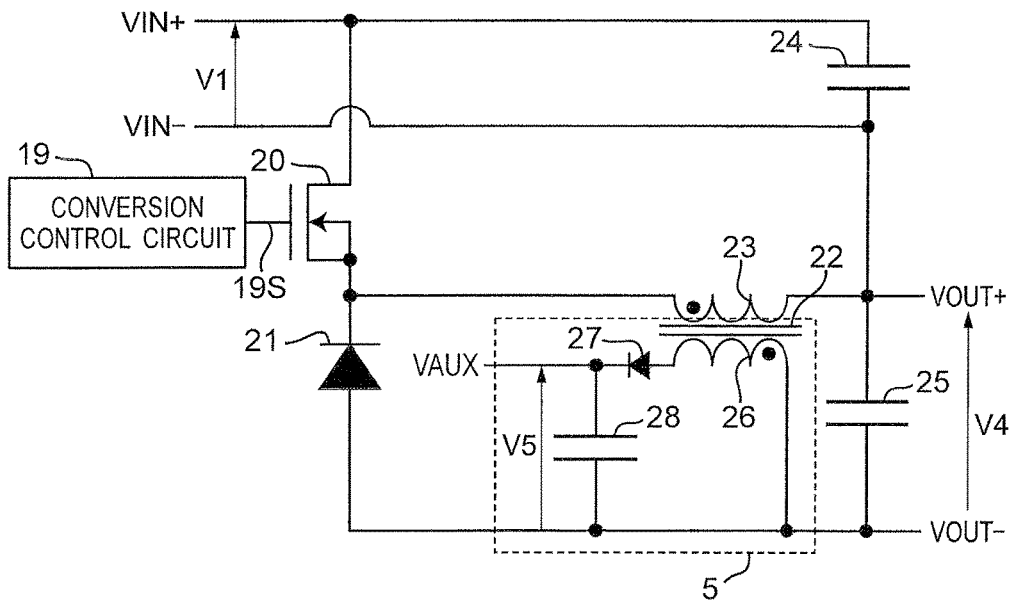
FIG. 8 is a circuit diagram showing detailed configurations of a power factor correction circuit 12A and a direct-current voltage source 5 in FIG. 7.

FIG. 8 is a circuit diagram showing detailed configurations of the power factor correction circuit 12A and direct-current voltage source 5 in FIG. 7.

FIG. 8 shows the power factor correction circuit 12A which has a configuration including a polarity reversal converter, as an example of a case where a step-up and step-down converter is used for the power factor correction circuit 12A. In FIG. 8, VIN+ and VIN− represent a positive voltage and a negative voltage of an input, respectively, and VOUT+ and VOUT− represent a positive voltage and a negative voltage of an output, respectively. V1, V4, and V5 are the same as the voltages shown in FIG. 1, 3, 4, 6, or 7, respectively.

In FIG. 8, the polarity reversal converter in the power factor correction circuit 12A is configured to include a conversion control circuit 19, a drive element 20, a rectification element 21, a main winding 23 of a transformer 22, an input bypass capacitor 24, and an output capacitor 25. In this case, the drive element 20 is a MOS transistor, for example, and the rectification element 21 is a diode, for example. An input voltage V1 is applied to the input bypass capacitor 24, the input bypass capacitor 24 and the output capacitor 25 are connected in series to each other, and a junction point of those capacitors is connected so that feedback is provided to an input-voltage side via the main winding 23 and the drive element 20. One end of the output capacitor 25 is coupled to a cathode of the rectification element 21 and the drive element 20 via the main winding 23, and the other end of the output capacitor 25 is coupled to an anode of the rectification element 21. In this case, the drive element 20 is controlled to be turned on/off by a control signal 19S from the conversion control circuit 19.

The direct-current voltage source 5 has a configuration using an auxiliary winding 26 of the transformer 22 in the power supply apparatus 101, 102, 103, 104, or 105 shown in FIG. 1, 3, 4, 6, or 7, and VAUX represents an output voltage from an output terminal of the direct-current voltage source 5. An output voltage from the auxiliary winding 26 serves as an output voltage V5, passing through a rectification element 27, which is a diode, for example, and a smoothing capacitor 28.

Next, operations of the direct-current voltage source 5 using the auxiliary winding 26 will be described below, with reference to FIG. 8. In this case, assume that the main winding 23 and the auxiliary winding 26 of the transformer 22 have a turn ratio of N to 1.

First of all, when the drive element 20 is turned off and the rectification element 21 is rectifying, a voltage V4 is applied to the main winding 23. A voltage (V4/N) generates in the auxiliary winding 26, and the smoothing capacitor 28 is charged via the rectification element 27. Accordingly, the voltage V5 is equal to the voltage (V4/N). By adjusting N in accordance with the voltage V4, it is possible to set the voltage V5.

Subsequently, when the drive element 20 is turned on, a voltage V1 is applied to the main winding 23. A voltage (−V1/N) generates in the auxiliary winding 26, a reverse bias voltage is applied to the rectification element 27, and charging of the smoothing capacitor 28 is stopped. Thus, the smoothing capacitor 28 is charged only in a period during which the drive element 20 is turned off.

As described above, it is clear that the voltage V5 varies due to variation in the main winding 23 and the auxiliary winding 26, or variation in the voltage V4, in the configuration of the direct-current voltage source 5 shown in FIG. 8. However, while an output voltage includes pulsation in a typical power factor correction circuit, pulsation in the output voltage V4 is reduced in the above-described system, which eliminates a need to include a pulsating voltage in variation in the voltage V4. Thus, variation in the voltage V5 is smaller than that in the prior art.

Figure 9:
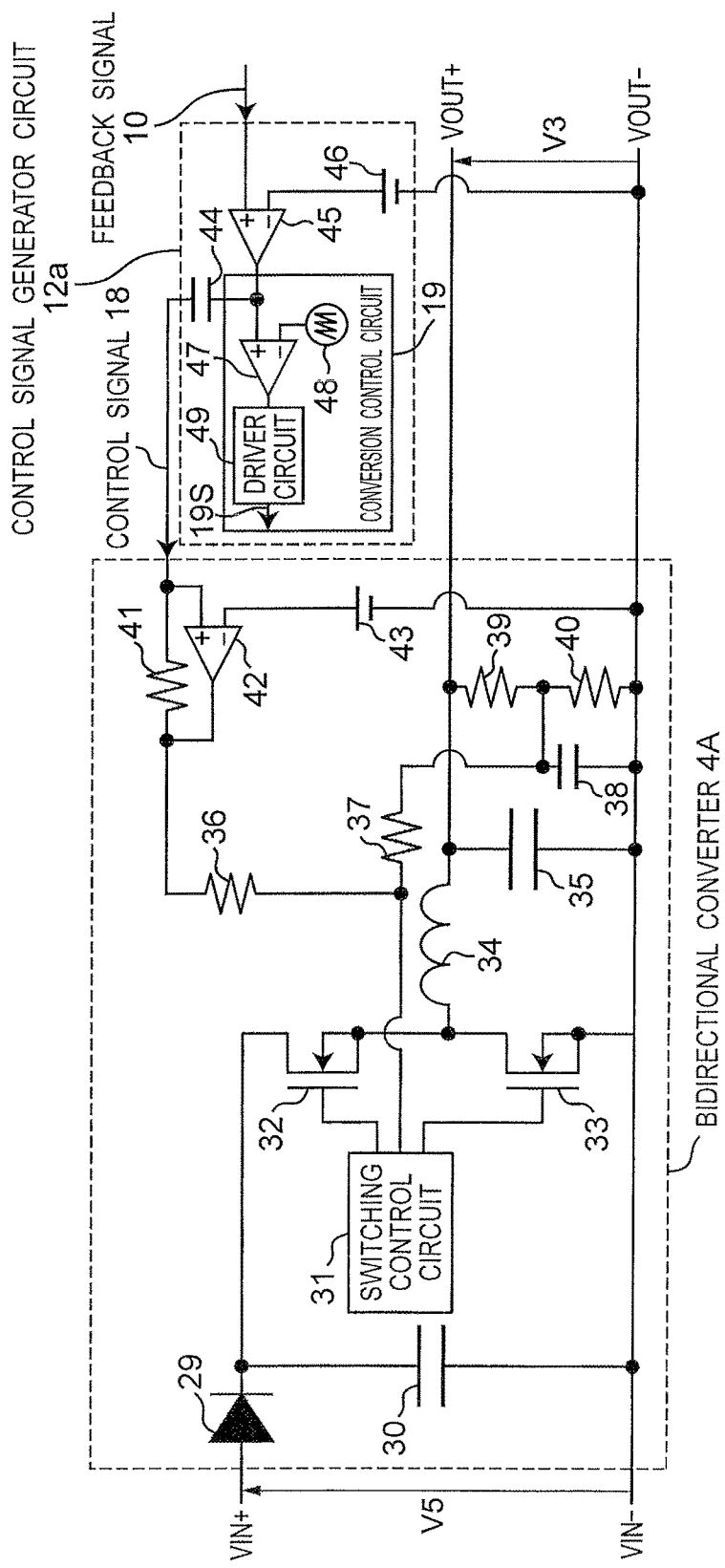
FIG. 9 is a circuit diagram showing detailed configurations of a bidirectional converter 4A and a control signal generator circuit 12a in FIG. 7.

FIG. 9 is a circuit diagram showing detailed configurations of the bidirectional converter 4A and control signal generator circuit 12a in FIG. 7. In this case, an example in which a step-down converter is used for the bidirectional converter 4A is shown.

In FIG. 9, the power factor correction circuit 12A includes the control signal generator circuit 12a, and the control signal generator circuit 12a is configured to include a phase compensation capacitor 44, the differential amplifier 45, a reference voltage source 46, and the conversion control circuit 19. In this case, the conversion control circuit 19 is configured to include a differential amplifier 47, a sawtooth oscillator 48, and a driver circuit 49. In addition, the bidirectional converter 4A includes a diode 29, an input bypass capacitor 30, a drive element 32, a rectification element 33, an inductor 34, an output capacitor 35, and voltage dividing resistors 39 and 40. The bidirectional converter 4A further includes a filter capacitor 38, decoupling resistors 36 and 37, a switching control circuit 31, a reference voltage source 43, a differential amplifier 42, and a high-frequency response adjusting resistor 41. In this case, the power factor correction circuit 12A and the bidirectional converter 4A are coupled to each other via the phase compensation capacitor 44.

In FIG. 9, the diode 29 is interposed at an input terminal in order to prevent a back-flowing current of the bidirectional converter 4A from flowing into an input. The input bypass capacitor 30 smooths a current flowing in each of two opposite directions of the bidirectional converter 4A. A smoothed voltage is subjected to switching by the drive element 32 and the rectification element 33 each driven by a control signal from the switching control circuit 31, and thereafter, is output as an output voltage V3, via the inductor 34 and the output capacitor 35. The output voltage V3 is divided by the voltage dividing resistors 39 and 40. A voltage resulted from voltage division is fed back to the switching control circuit 31 via the decoupling resistor 37. In addition, a feedback signal 10 generated from a pulsating current outputted from the power factor correction circuit 12A is input to the control signal generator circuit 12a in the power factor correction circuit 12A. The feedback signal 10 is input, as a control signal 18, to the bidirectional converter 4A via the differential amplifier 45 and the phase compensation capacitor 44. Only a high-frequency component of the control signal 18, which includes the above-stated pulsation, is amplified by the differential amplifier 42 and the high-frequency response adjusting resistor 41 in the bidirectional converter 4A, and is input to the switching control circuit 31 via the decoupling resistor 36. That is, the switching control circuit 31 of the bidirectional converter 4A receives both inputs of:

(1) a control signal for making an average value of the voltage V3 constant, via the decoupling resistor 37; and (2) a signal for controlling V3 in accordance with a pulsating current outputted from a power factor correction circuit, via the decoupling resistor 36.

Then, the switching control circuit 31 can control the voltage V3 so that the voltage V4 is constant, as a consequence.

It is additionally noted that the differential amplifier 47 generates a voltage difference between a voltage signal outputted from the differential amplifier 45 and a sawtooth voltage from the sawtooth oscillator 48, and outputs the voltage difference to the driver circuit 49, in the conversion control circuit 19. The driver circuit 49 drives the voltage difference input thereto, to generate a control signal 19S.

A voltage that generates in the input bypass capacitor 30 is a pulsating voltage, a minimum value of which is equal to the voltage V5, so that a withstand voltage that the bidirectional converter 4A is required to have, can be made lower as capacitance of the input bypass capacitor 30 increases. Each of the drive element 32 and the rectification element 33 is required to have a withstand voltage not lower than a voltage that generates in the input bypass capacitor 30. In a case where the voltage V5 has amplitude of 20 V, for example, and a pulsating voltage that generates in the input bypass capacitor 30 has amplitude of 5 V, for example, each of the drive element 32 and the rectification element 33 can be constituted of an element having a withstand voltage not lower than 25 V. The output capacitor 35 is used for smoothing a ripple current of the inductor 34. An average value of the voltage V3 is determined as a result of feedback of a voltage divided by the voltage dividing resistors 39 and 40, and then, is smoothed by the filter capacitor 38, to the switching control circuit 31. In a case where a control voltage of the switching control circuit 31 is 1 V, for example, assuming that the voltage dividing resistor 39 is 90 kΩ and the voltage dividing resistor 40 is 10 kΩ, the voltage V3 is 10 V on average and has a waveform having amplitude of 20 V. In a case where the bidirectional converter 4A is constituted of an element having a withstand voltage of 30 V, for example, a scale of the bidirectional converter 4A can be reduced to one-tenth or smaller of a smoothing switching converter used in a two-converter system.

Figure 10:
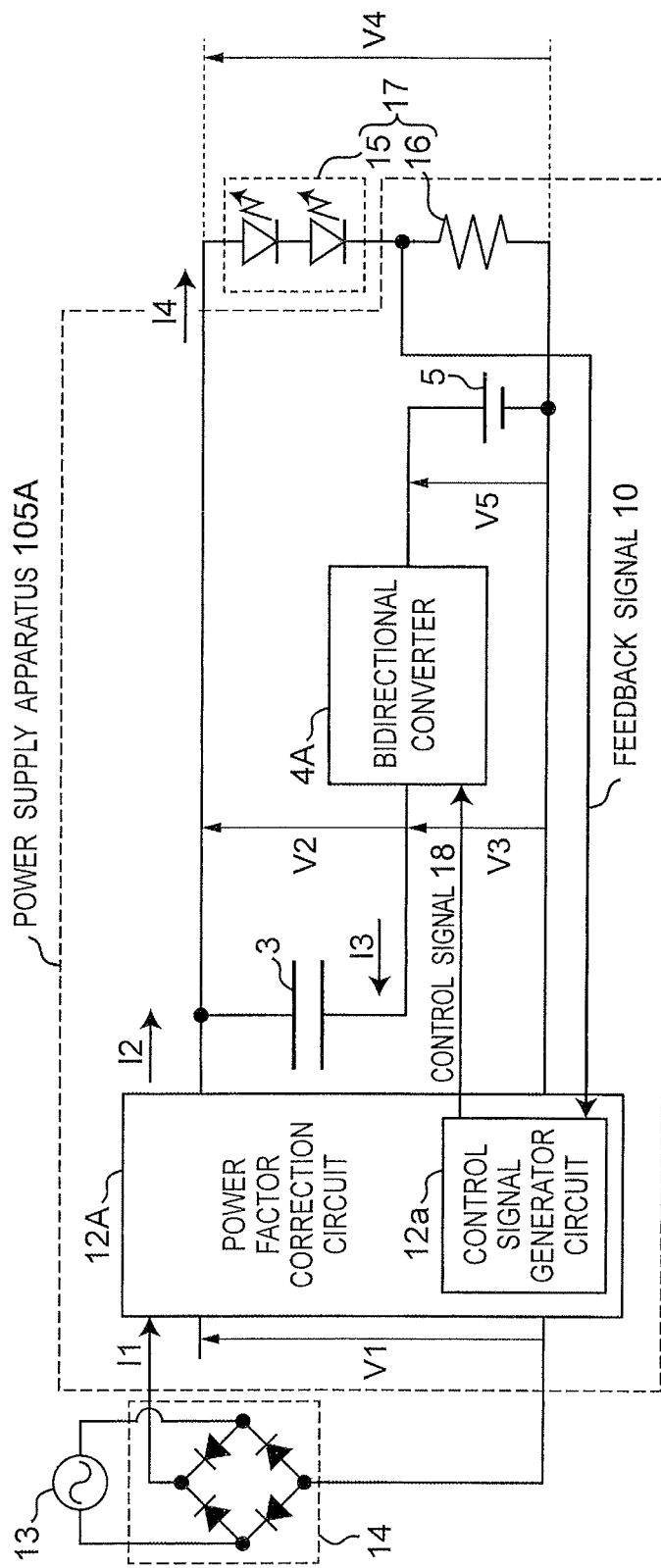
FIG. 10 is a circuit diagram showing a configuration of a power supply apparatus 105A according to a first modified embodiment of the fifth preferred embodiment of the present invention.

FIG. 10 is a circuit diagram showing a configuration of a power supply apparatus 105A according to a first modified embodiment of the fifth preferred embodiment of the present invention. In FIG. 10, the power supply apparatus 105A is different from the power supply apparatus 105 according to the fifth preferred embodiment in that the load 8 is replaced with a series circuit in which an LED light emitting element 15 formed of series connection of, for example, two LEDs D1 and D2, and a current sensing resistor 16 are connected in series, and that the series circuit serves as a voltage dividing circuit 17. The configuration, functions, and effects in the other respects are similar to those in the fifth preferred embodiment.

Figure 11:
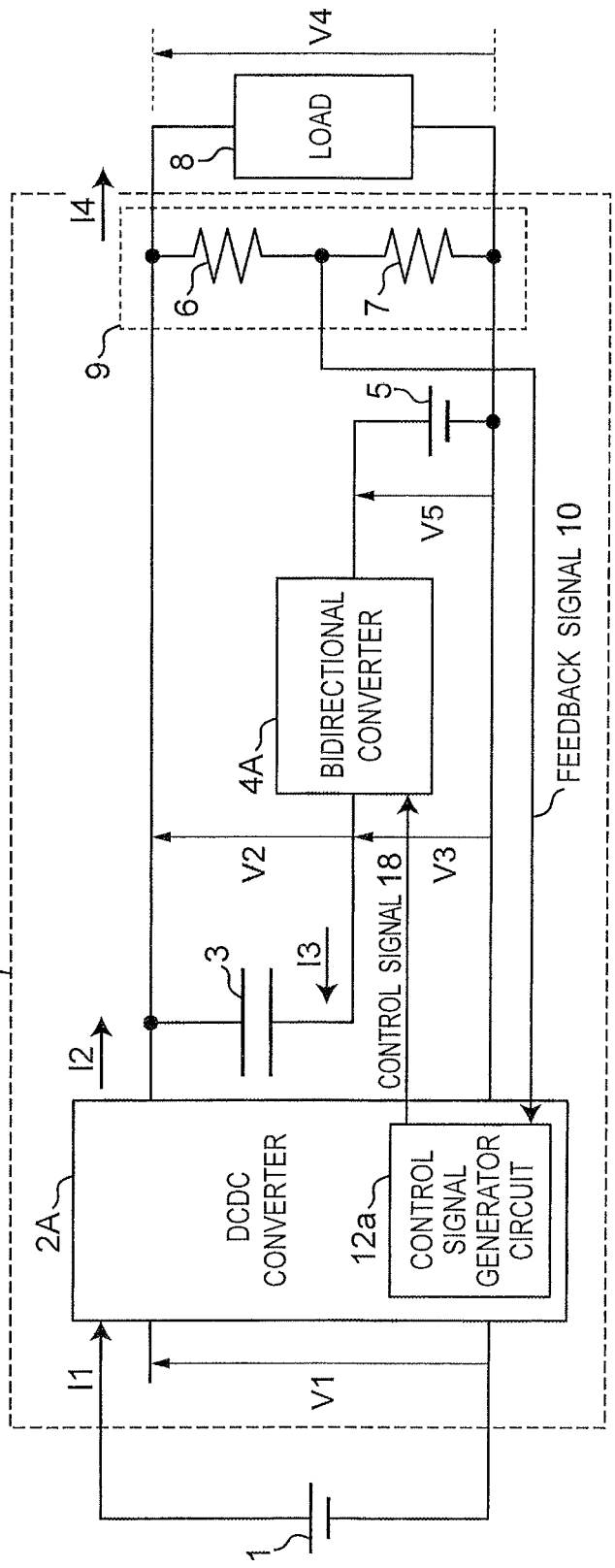
FIG. 11 is a circuit diagram showing a configuration of a power supply apparatus 105B according to a second modified embodiment of the fifth preferred embodiment of the present invention.

FIG. 11 is a circuit diagram showing a configuration of a power supply apparatus 105B according to a second modified embodiment of the fifth preferred embodiment of the present invention. In FIG. 11, the power supply apparatus 105B is different from the power supply apparatus 105 according to the fifth preferred embodiment in that the power factor correction circuit 12A is replaced with a DCDC converter 2A including a control signal generator circuit 12a. The configuration, functions, and effects in the other respects are similar to those in the fifth preferred embodiment. It is additionally noted that an input terminal of the DCDC converter 2A is coupled to a direct-current voltage source 1.

Figure 12:
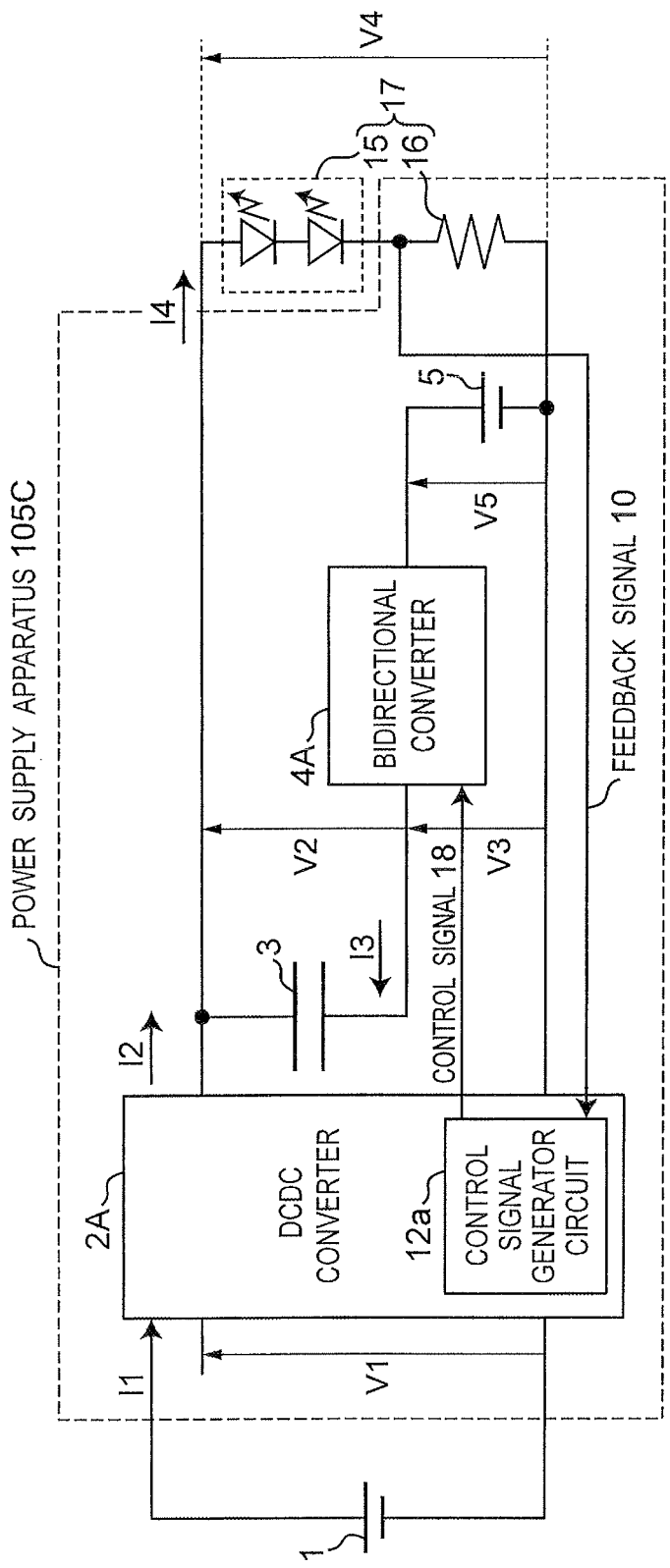
FIG. 12 is a circuit diagram showing a configuration of a power supply apparatus 105C according to a third modified embodiment of the fifth preferred embodiment of the present invention.

FIG. 12 is a circuit diagram showing a configuration of a power supply apparatus 105C according to a third modified embodiment of the fifth preferred embodiment of the present invention. In FIG. 12, the power supply apparatus 105C is different from the power supply apparatus 105B in FIG. 11 in that the load 8 is replaced with a series circuit in which an LED light emitting element 15 foinied of series connection of, for example, two LEDs D1 and D2, and a current sensing resistor 16 are connected in series, and that the series circuit serves as a voltage dividing circuit 17. The configuration, functions, and effects in the other respects are similar to those in the second modified embodiment of the fifth preferred embodiment. It is additionally noted that an input terminal of a DCDC converter 2A is coupled to a direct-current voltage source 1.

Next, sixth to ninth preferred embodiments will discuss overall configurations of the first to fifth preferred embodiments with reference to FIGS. 13 to 16.

SIXTH PREFERRED EMBODIMENT

Figure 13:
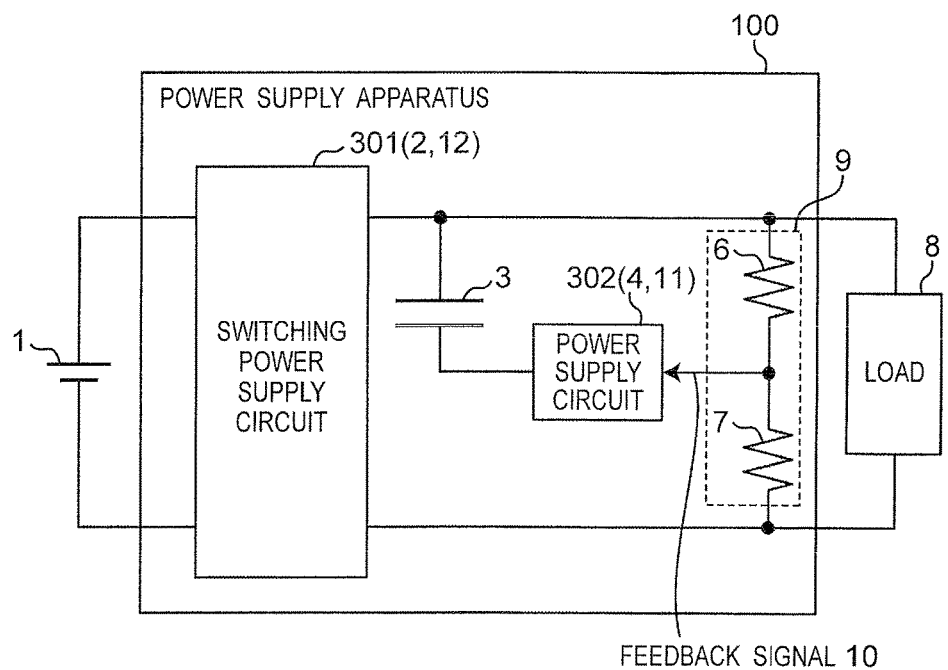
FIG. 13 is a circuit diagram showing a configuration of a power supply apparatus 100 according to a sixth preferred embodiment of the present invention.

FIG. 13 is a circuit diagram showing a configuration of a power supply apparatus 100 according to a sixth preferred embodiment of the present invention. In FIG. 13, the power supply apparatus 100 is coupled to be interposed between a direct-current voltage source 1 and a load 8 and is configured to include:

(1) a switching power supply circuit 301 constituted of a DCDC converter 2 or a power factor correction circuit 12;
(2) a smoothing capacitor 3;
(3) a power supply circuit 302 constituted of a bidirectional converter 4 or a linear regulator 11; and
(4) a voltage dividing circuit 9 that includes voltage dividing resistors 6 and 7 connected in series and outputs a feedback signal 10 of a divided voltage.

The power supply apparatus 100 configured as described above is similar in functions and effects to the power supply apparatuses 101, 102, 103, 105, and 105B.

SEVENTH PREFERRED EMBODIMENT

Figure 14:
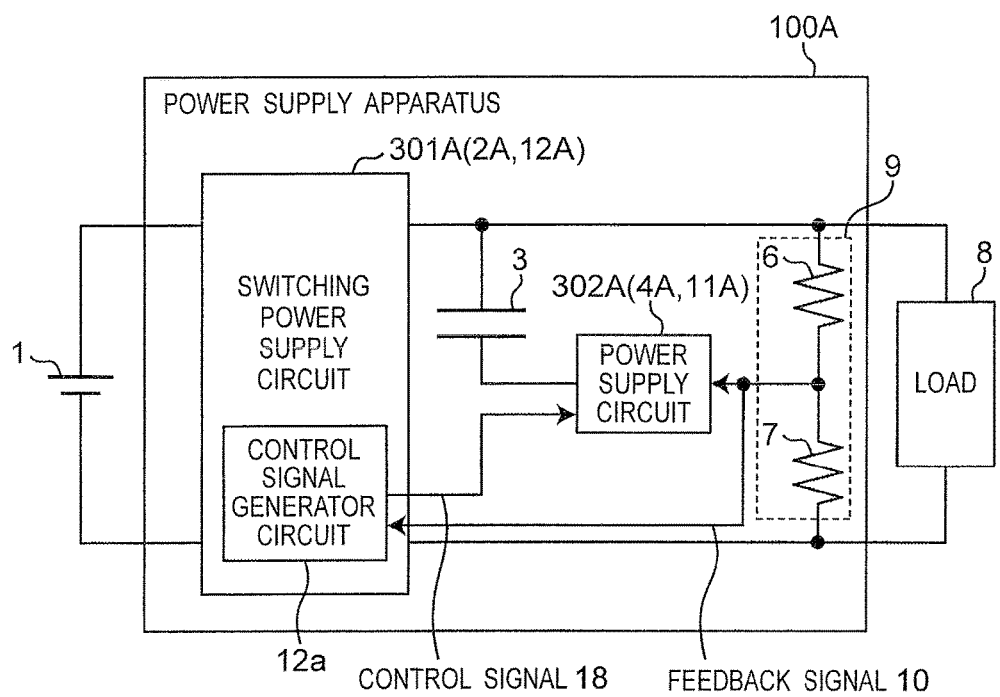
FIG. 14 is a circuit diagram showing a configuration of a power supply apparatus 100A according to a seventh preferred embodiment of the present invention.

FIG. 14 is a circuit diagram showing a configuration of a power supply apparatus 100A according to a seventh preferred embodiment of the present invention. In FIG. 14, the power supply apparatus 100A is coupled to be interposed between a direct-current voltage source 1 and a load 8 and is configured to include:

(1) a switching power supply circuit 301A constituted of a DCDC converter 2A or a power factor correction circuit 12A that includes a control signal generator circuit 12a;
(2) a smoothing capacitor 3;
(3) a power supply circuit 302A constituted of a bidirectional converter 4A or a linear regulator 11A; and
(4) a voltage dividing circuit 9 that includes voltage dividing resistors 6 and 7 connected in series and outputs a feedback signal 10 of a divided voltage.

The power supply apparatus 100A configured as described above is similar in functions and effects to the power supply apparatuses 104, 105A, and 105C.

EIGHTH PREFERRED EMBODIMENT

Figure 15:
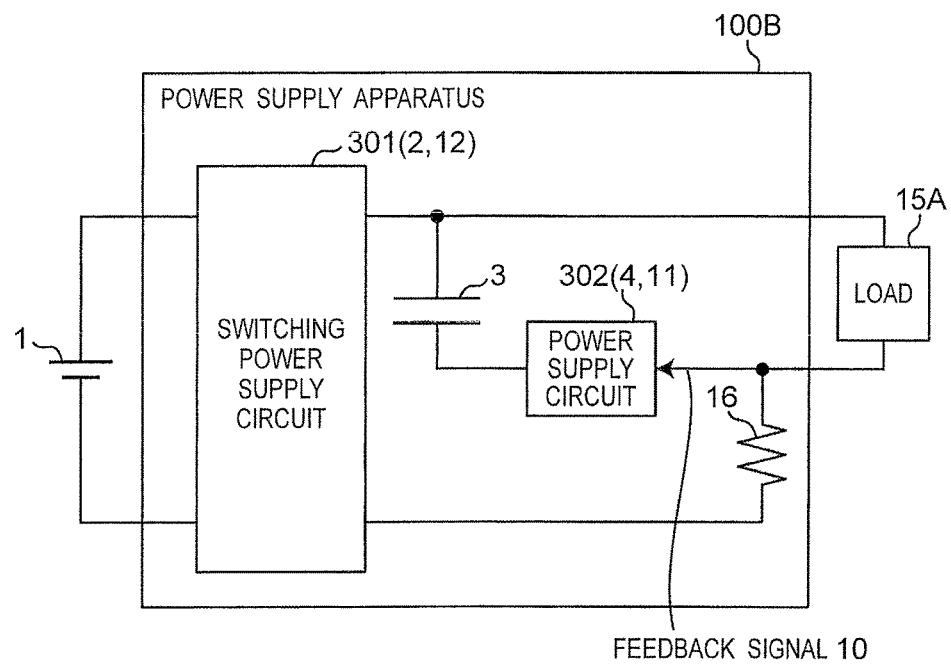
FIG. 15 is a circuit diagram showing a configuration of a power supply apparatus 100B according to an eighth preferred embodiment of the present invention.

FIG. 15 is a circuit diagram showing a configuration of a power supply apparatus 100B according to an eighth preferred embodiment of the present invention. In FIG. 15, the power supply apparatus 100B is different from the power supply apparatus 100 in FIG. 13 in the following respects.

(1) The power supply apparatus 100B includes, instead of the load 8, a load 15A such as an LED light emitting element 15, for example, which is placed at a position where a voltage dividing resistor 6 is coupled.
(2) The power supply apparatus 100B includes, instead of the voltage dividing resistor 7, a current sensing resistor 16.

The power supply apparatus 100B configured as described above is similar in functions and effects to the power supply apparatuses 105A and 105C.

NINTH PREFERRED EMBODIMENT

Figure 16:
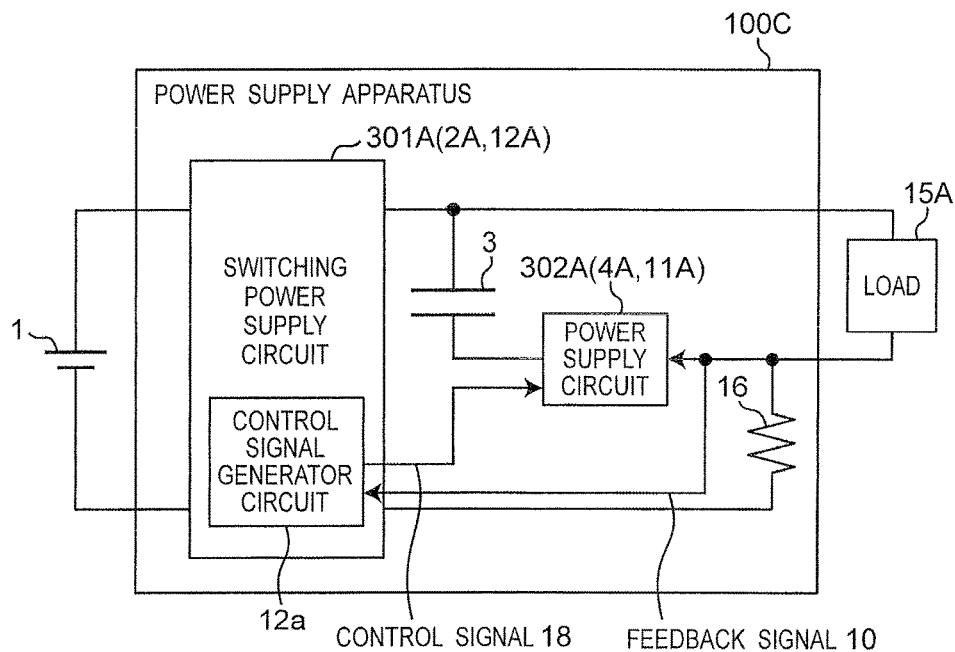
FIG. 16 is a circuit diagram showing a configuration of a power supply apparatus 100C according to a ninth preferred embodiment of the present invention.

FIG. 16 is a circuit diagram showing a configuration of a power supply apparatus 100C according to a ninth preferred embodiment of the present invention. In FIG. 16, the power supply apparatus 100C is different from the power supply apparatus 100A in FIG. 14 in the following respects.

(1) The power supply apparatus 100C includes, instead of the load 8, a load 15A such as an LED light emitting element 15, for example, which is placed at a position where a voltage dividing resistor 6 is coupled.
(2) The power supply apparatus 100C includes, instead of the voltage dividing resistor 7, a current sensing resistor 16.

The power supply apparatus 100C configured as described above is similar in functions and effects to the power supply apparatuses 105A and 105C.

TENTH PREFERRED EMBODIMENT

Figure 17:
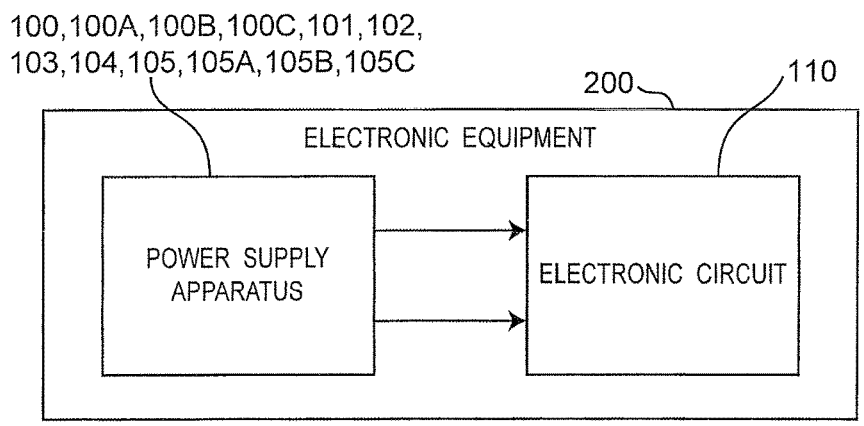
FIG. 17 is a block diagram showing a configuration of electronic equipment 200 according to a tenth preferred embodiment of the present invention.

FIG. 17 is a block diagram showing a configuration of electronic equipment 200 according to a tenth preferred embodiment of the present invention. In FIG. 17, the electronic equipment 200 is configured to include:

(1) the power supply apparatus 100, 100A, 100B, 100C, 101, 102, 103, 104, 105, 105A, 105B, or 105C; and
(2) an electronic circuit 110 which is a predetermined load.

The electronic equipment 200 is, for example, a portable telephone, a smartphone, a personal computer, or a multi-functional peripheral including a scanner and a printer, for example. A direct-current voltage from the power supply apparatus 100, 100A, 100B, 100C, 101, 102, 103, 104, 105, 105A, 105B, or 1050 is supplied to the electronic circuit 110.

EFFECTS OF PREFERRED EMBODIMENTS (1) In a case where the DCDC converter 2 or 2A is used as the switching power supply circuit 301 or 301A, the power supply circuit 302 or 302A which is improved so as to have higher responsiveness than responsiveness of the DCDC converter 2 or 2A is included. Accordingly, an excess or a deficiency relative to a desired direct-current current or voltage of the load 8 or 15A is compensated via the smoothing capacitor 3, so that load-transient response characteristics of the switching power supply circuit 301 or 301A can be improved.

(2) When the power factor correction circuit 12 or 12A serves as the switching power supply circuit 301 or 301A, the power supply circuit 302 or 302A which has higher responsiveness than that of the power factor correction circuit 12 or 12A is included. The power supply circuit 302 or 302A compensates for an excess or a deficiency in a pulsating current or voltage outputted from the power factor correction circuit 12 or 12A, with respect to a desired direct-current current or voltage of the load 8 or 15A via the smoothing capacitor 3. This can reduce pulsating components occurring due to the power factor correction circuit 12 or 12A.

(3) In a case where the bidirectional converter 4 or 4A is used as the power supply circuit 302 or 302A, excess electric power relative to desired electric power of the load 8 or 15A can be stored and a deficiency can be compensated by the stored excess electric power. Accordingly, a reduction in efficiency of the power supply apparatus 100, 100A, 100B, 100C, 101, 102, 103, 104, 105, 105A, 105B, or 105C can be minimized.

(4) In a case where the linear regulator 11 or 11A is used as the power supply circuit 302 or 302A, though excess electric power is not stored but calculated as loss, the power supply circuit 302 or 302A can be typically constituted of a simpler circuit than that of the bidirectional converter 4 or 4A, so that a reduction in size can be achieved.

(5) As described above, what is required of the power supply circuit 302 or 302A is to output only an excess or a deficiency relative to a desired direct-current current or voltage of the load 8 or 15A. That is, the power supply circuit 302 or 302A can operate with a withstand voltage lower than a desired withstand voltage of the power supply apparatus 100, 100A, 100B, 100C, 101, 102, 103, 104, 105, 105A, 105B, or 105C. Accordingly, the power supply apparatus according to the present invention can reduce switching loss, a noise, and a mounting volume, as compared to the prior art having functions similar to those of the present invention, and can achieve efficiency higher than that in the prior art.

While the smoothing capacitor 3 is used in the above-described preferred embodiments, the present invention is not limited thereto, and a capacitor may be used.

What is claimed is:

1. A power supply apparatus having an input terminal and an output terminal, the power supply apparatus converting an input voltage at the input terminal into a predetermined output voltage at the output terminal, the power supply apparatus comprising:
a first power supply circuit that is coupled between the input terminal and the output terminal and converts the input voltage into a predetermined voltage to output the predetermined voltage;
a smoothing capacitor that is coupled to the output terminal; and
a second power supply circuit that outputs a predetermined voltage or current to the output terminal via the smoothing capacitor, based on a feedback signal corresponding to the predetermined output voltage.

2. The power supply apparatus as claimed in claim 1, wherein the second power supply circuit converts a first direct-current voltage into a second direct-current voltage to output the second direct-current voltage to the smoothing capacitor, or the second power supply circuit converts a second direct-current voltage from the smoothing capacitor into a first direct-current voltage to output the first direct-current voltage.

3. The power supply apparatus as claimed in claim 1, wherein the second power supply circuit converts a first direct-current voltage into a second direct-current voltage to output the second direct-current voltage to the smoothing capacitor.

4. The power supply apparatus as claimed in claim 1, wherein the second power supply circuit includes a step-up and step-down converter.

5. The power supply apparatus as claimed in claim 2, wherein the second power supply circuit includes a step-up and step-down converter.

6. The power supply apparatus as claimed in claim 1, wherein the second power supply circuit includes a linear regulator.

7. The power supply apparatus as claimed in claim 3, wherein the second power supply circuit includes a linear regulator.

8. The power supply apparatus as claimed in claim 1, wherein the first power supply circuit includes a DCDC converter.

9. The power supply apparatus as claimed in claim 2, wherein the first power supply circuit includes a DCDC converter.

10. The power supply apparatus as claimed in claim 1, wherein the first power supply circuit includes a power factor correction circuit.

11. The power supply apparatus as claimed in claim 2, wherein the first power supply circuit includes a power factor correction circuit.

12. The power supply apparatus as claimed in claim 8, wherein the DCDC converter includes a step-up and step-down converter.

13. The power supply apparatus as claimed in claim 10, wherein the power factor correction circuit includes a step-up and step-down converter.

14. The power supply apparatus as claimed in claim 1, further comprising:
a voltage dividing circuit that includes a first resistor and a second resistor, performs voltage division on a voltage at the output terminal, and generates a feedback signal having a voltage obtained by the voltage division; and
a control signal generator circuit that generates a control signal for making a current flowing through the first resistor constant, to output the control signal to the second power supply circuit, based on the feedback signal.

15. The power supply apparatus as claimed in claim 14, wherein the control signal generator circuit includes a differential amplifier that outputs, as the control signal, a voltage difference between the voltage of the feedback signal and a predetermined threshold voltage.

16. The power supply apparatus as claimed in claim 14, wherein the first resistor is a load of the power supply apparatus.

17. Electronic equipment comprising:
a power supply apparatus that has an input terminal and an output terminal and converts an input voltage at the input terminal into a predetermined output voltage at the output terminal to output the predetermined output voltage to an electronic circuit,
wherein the power supply apparatus includes:
a first power supply circuit that is coupled between the input terminal and the output terminal and converts the input voltage into a predetermined voltage to output the predetermined voltage;
a smoothing capacitor that is coupled to the output terminal; and
a second power supply circuit that outputs a predetermined voltage or current to the output terminal via the smoothing capacitor, based on a feedback signal corresponding to the predetermined output voltage.

18. The electronic equipment as claimed in claim 17, wherein the second power supply circuit converts a first direct-current voltage into a second direct-current voltage to output the second direct-current voltage to the smoothing capacitor, or the second power supply circuit converts a second direct-current voltage from the smoothing capacitor into a first direct-current voltage to output the first direct-current voltage.

19. A power supply circuit for a power supply apparatus that has an input terminal and an output terminal and converts an input voltage at the input terminal into a predetermined output voltage at the output terminal to output the predetermined output voltage to a load,
wherein the power supply apparatus includes:
a first power supply circuit that is coupled between the input terminal and the output terminal and converts the input voltage into a predetermined voltage to output the predetermined voltage;
a smoothing capacitor that is coupled to the output terminal; and a second power supply circuit that outputs a predetermined voltage or current to the output terminal via the smoothing capacitor, based on a feedback signal corresponding to the predetermined output voltage, and wherein the power supply circuit serves as the first power supply circuit.

20. The power supply circuit as claimed in claim 19, wherein the first power supply circuit includes a control signal generator circuit that generates a control signal for making constant a current flowing through the load or a voltage dividing resistor of a voltage dividing circuit coupled to the output terminal, to output the control signal to the second power supply circuit, based on the feedback signal.

21. The power supply circuit as claimed in claim 20, wherein the control signal generator circuit includes a differential amplifier that outputs, as the control signal, a voltage difference between the voltage of the feedback signal and a predetermined threshold voltage.

22. The power supply circuit as claimed in claim 19 wherein the first power supply circuit includes a power factor correction circuit.

23. The power supply circuit as claimed in claim 19, wherein the first power supply circuit includes a DCDC converter.

* * * * *